(12) United States Patent
Xin et al.

(10) Patent No.: US 10,917,282 B2
(45) Date of Patent: Feb. 9, 2021

(54) DATA MODULATION METHOD AND DEVICE UTILIZED IN MULTI-CARRIER SYSTEM

(71) Applicant: ZTE CORPORATION, Guangdong (CN)

(72) Inventors: Yu Xin, Guangdong (CN); Luanjian Bian, Guangdong (CN)

(73) Assignee: ZTE Corporation, Guangdong (CN)

( * ) Notice: Subject to any disclaimer, the term of this patent is extended or adjusted under 35 U.S.C. 154(b) by 21 days.

(21) Appl. No.: 16/342,870

(22) PCT Filed: Sep. 4, 2017

(86) PCT No.: PCT/CN2017/100372
§ 371 (c)(1),
(2) Date: Apr. 17, 2019

(87) PCT Pub. No.: WO2018/072565
PCT Pub. Date: Apr. 26, 2018

(65) Prior Publication Data
US 2019/0245731 A1    Aug. 8, 2019

(30) Foreign Application Priority Data

Oct. 18, 2016  (CN) .......................... 2016 1 0907381

(51) Int. Cl.
| | |
|---|---|
| H04W 4/00 | (2018.01) |
| H04L 27/34 | (2006.01) |
| H04L 27/26 | (2006.01) |
| H04L 5/00 | (2006.01) |

(52) U.S. Cl.
CPC .......... H04L 27/3494 (2013.01); H04L 27/26 (2013.01); H04L 27/2605 (2013.01); H04L 27/2628 (2013.01); H04L 5/0007 (2013.01)

(58) Field of Classification Search
CPC . H04L 27/3494; H04L 27/26; H04L 27/2605; H04L 27/2628; H04L 5/0007; H04L 27/2627; H04L 27/0008
USPC ......................................................... 370/329
See application file for complete search history.

(56) References Cited

U.S. PATENT DOCUMENTS 7,636,380 B2 * 12/2009 Yao .................... H04B 1/71632
370/203
2005/0249266 A1 * 11/2005 Brown ................ H04L 27/2601
375/133

FOREIGN PATENT DOCUMENTS

| CN | 101867547 A | 10/2010 |
|---|---|---|
| CN | 103326972 A | 9/2013 |
| WO | 2009089733 A1 | 7/2009 |

OTHER PUBLICATIONS

Xin Yu et al., "FB-OFDM: A Novel Multicarrier Scheme for 5G", Jun. 30, 2016. (From Applicant's IDS) (Year: 2016).*
International Search Report dated Oct. 27, 2017 for International Application No. PCT/CN2017/100372, 5 pages.
Written Opinion of the International Searching Authority dated Oct. 27, 2017 for International Application No. PCT/CN2017/100372, 3 pages.

(Continued)

Primary Examiner — Mang Hang Yeung
(74) Attorney, Agent, or Firm — Knobbe Martens Olson & Bear LLP (57) ABSTRACT

A data modulation method and device utilized in a multi-carrier system. The method includes: performing, by a transmitting node, data modulation by adopting at least two different waveform functions.

17 Claims, 2 Drawing Sheets

Adopt at least two different waveform functions by a transmitting node — S110

Perform, by the transmitting node, data modulation on respective data to be transmitted corresponding to the at least two different waveform functions according to the at least two different waveform functions — S120

(56) References Cited

OTHER PUBLICATIONS

Xin Yu et al., "FB-OFDM: A Novel Multicarrier Scheme for 5G", 2016 European Conference on Networks and Communications (EuCNC), (Jun. 30, 2016).

张万春等, "一种适合5G的新型多载波技术—-FB-OFDM", 中兴通讯技术, 第22卷, 第3期, 2016年6月30日 (Jun. 30, 2016), ISSN:1009-6868, pp. 23 and 24. (Zhang, Wanchun et al. FB-OFDM: A Novel Multicarrier Scheme for 5G. ZTE Technology Journal.).

* cited by examiner

DATA MODULATION METHOD AND DEVICE UTILIZED IN MULTI-CARRIER SYSTEM

This application is a US national phase application under 35 U.S.C. § 371 of international patent application No. PCT/CN2017/100372 filed on Sep. 4, 2017, which claims priority to Chinese patent application No. 201610907381.0, entitled "DATA MODULATION METHOD AND DEVICE UTILIZED IN MULTI-CARRIER SYSTEM" and filed on Oct. 18, 2016, the disclosures of each of which are incorporated therein by reference in their entireties.

TECHNICAL FIELD

The present disclosure relates to, but is not limited to, the field of communications and, in particular, relates to a data modulation method and device utilized in a multi-carrier system.

BACKGROUND

The Long Term Evolution (LTE) is long-term evolution of technology standards, developed by the 3rd Generation Partnership Project (3GPP), of the Universal Mobile Telecommunications System (UMTS). The LTE system introduces an orthogonal frequency division multiplexing (OFDM) technology. Therefore, time-frequency resources composed of subcarriers and OFDM symbols constitute a wireless physical time-frequency resource of the LTE system. Meanwhile, the LTE system introduces a cyclic prefix (CP) in the OFDM technology, that is, CP-OFDM, so that the system has good performance. However, since a rectangular function is adopted in a windowing technique of the CP-OFDM, the spectral leakage is relatively large. Therefore, the 3GPP conducts a huge number of researches on new waveform techniques in the fifth generation (5G) communications to suppress an out-of-band leakage and improve utilization efficiency of the adjacent spectrum.

SUMMARY

A summary of the subject matter is described hereinafter in detail. This summary is not intended to limit the scope of the claims.

In the application of new waveform techniques, it is necessary to adopt a new waveform function and be compatible with an early version of a user terminal (that is, a terminal which adopts a CP-OFDM rectangular function) in a multi-carrier system. To enable the multi-carrier system to adapt to more application scenarios, many waveform functions may coexist. However, the current multi-carrier system adopts only one waveform function, i.e., a rectangular function. Embodiments of the present disclosure aim to provide a data modulation method and device utilized in the multi-carrier system to perform data modulation on data to be transmitted by adopting at least two different waveform functions so that various types of waveform modulation are applicable to the multi-carrier system and the multi-carrier system is compatible with the rectangular waveform modulation.

In a first aspect, an embodiment of the present disclosure provides a data modulation method utilized in a multi-carrier system. The method includes steps described below.

A transmitting node adopts at least two different waveform functions.

The transmitting node performs data modulation on respective data to be transmitted corresponding to the at least two different waveform functions according to the at least two different waveform functions.

In a second aspect, an embodiment of the present disclosure provides a data modulation device utilized in a multi-carrier system. The device includes a configuration module and a modulation module.

The configuration module is configured to adopt at least two different waveform functions.

The modulation module is configured to preform data modulation on respective data to be transmitted corresponding to the at least two different waveform functions according to the at least two different waveform functions.

In a third aspect, an embodiment of the present disclosure provides a computer-readable storage medium for storing computer-executable instructions that when executed by the processor cause the processor to execute the preceding data modulation method utilized in the multi-carrier system.

The embodiments of the present disclosure provide the data modulation method and device utilized in the multi-carrier system. With the method, the at least two different waveform functions are adopted and the data modulation is performed on the respective data to be transmitted corresponding to the at least two different waveform functions according to the at least two different waveform functions in the multi-carrier system. An appropriate waveform function can be selected according to practical application requirements in the multi-carrier system. Therefore, the various types of waveform modulation are applicable to the multi-carrier system and the multi-carrier system is compatible with the rectangular waveform modulation in the LTE system.

Other aspects may be apparent after the drawings and detailed description are read and understood.

DETAILED DESCRIPTION

Embodiments of the present disclosure will be described clearly and completely in conjunction with the accompanying drawings in the embodiments of the present disclosure.

Embodiment 1

As described in the background, a huge number of researches are conducted in new waveform techniques in a 5G wireless cellular communication technology to suppress an out-of-band leakage and improve utilization efficiency of an adjacent spectrum. In a 5G communication system, it is necessary to adopt a new waveform function and be compatible with an early version of a user terminal, that is, a terminal which adopts a CP-OFDM rectangular function. To enable the system to adapt to more application scenarios, many waveform functions may coexist. However, a current multi-carrier system adopts only one waveform function, i.e., a rectangular function. This embodiment proposes a method to enable various types of waveform modulation to be applicable to the multi-carrier system and enable the multi-carrier system to be compatible with rectangular waveform modulation.

The multi-carrier system in the embodiments of the present disclosure refers to, but is not limited to, a system which performs data transmission through a plurality of subcarriers, such as an OFDM system.

A transmitting end in the system includes various transmitting apparatus such as a base station, a terminal, a relay and a transmitting point (TP). Such transmitting apparatus is collectively referred to as a transmitting node in the present application.

Figure 1:
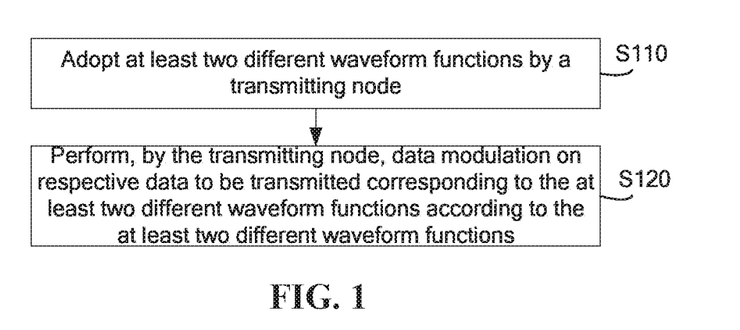
FIG. 1 is a schematic diagram of a data modulation method utilized in a multi-carrier system according to an embodiment of the present disclosure.

As shown in FIG. 1, this embodiment provides a data modulation method utilized in the multi-carrier system. The method may include steps described below.

In S110, the transmitting node adopts at least two different waveform functions.

It is understandable that the transmitting node may adopt the at least two different waveform functions in a way of adopting different waveform functions on different subbands or at different time points according to requirements of the application scenarios or in a way of adopting different waveform functions at a same time point on a same subband according to the requirements of the application scenarios. In addition, the subband includes k subcarriers and k is an integer greater than or equal to 1.

In S120, the transmitting node performs data modulation on respective data to be transmitted corresponding to the at least two different waveform functions according to the at least two different waveform functions.

The at least two different waveform functions may include a raised cosine function with a roll-off factor β equal to b, and a non-raised cosine function or another raised cosine function with the roll-off factor β not equal to b, where b is a real number greater than or equal to 0 and less than or equal to 1. That is to say, when the roll-off factors β are different, the raised cosine functions corresponding to the roll-off factors are different waveform functions. When the roll-off factor of the raised cosine function is equal to 0, the raised cosine function is the rectangular function. The non-raised cosine function may include a root raised cosine function, a piecewise function and the like.

The raised cosine function is represented as follows:

$$x(t) = \begin{cases} B & 0 \le |t| < T_0(1-\beta) \\ \frac{B}{2}\left(1 + \cos\left(\frac{|t| - T_0(1-\beta)}{2T_0\beta}\pi\right)\right) & T_0(1-\beta) \le |t| < T_0(1+\beta) \\ 0 & |t| \ge T_0(1+\beta) \end{cases}$$

where t denotes time, B is a preset value, β is the roll-off factor with a value range of [0,1], $T_0 = T_1/2$, $T_1$ denotes a time domain width parameter of the raised cosine function, $T_1(1+\beta) = N \times T$, N is a real number greater than or equal to 1, and T is a symbol interval. That is to say, a maximum time span between independent variables corresponding to non-zero function values of the raised cosine function is equal to N×T.

It is understandable that different waveform functions are applicable to different application scenarios. For example, the rectangular function in the CP-OFDM form has lowest complexity, good multipath delay resistivity, and most serious out-of-band leakage. The raised cosine function has a small calculation amount, inter-symbol interference and a slightly poor out-of-band leakage suppression effect so that the raised cosine function is applicable to an application scenario with the out-of-band leakage and simplified complexity. The larger the roll-off factor of the raised cosine function is, the greater the inter-symbol interference is and the better the out-of-band leakage suppression effect is. On the contrary, the smaller the roll-off factor of the raised cosine function is, the less the inter-symbol interference is and the worse the out-of-band leakage suppression effect is. The root-raised cosine function has a large calculation amount and a better out-of-band leakage suppression effect, and is applicable to an application scenario with serious out-of-band leakage and no requirements on calculation complexity.

In this embodiment, the step in which the transmitting node performs the data modulation on the respective data to be transmitted corresponding to the at least two different waveform functions according to the at least two different waveform functions may include steps described below.

Inverse fast Fourier transform (IFFT) is performed on the respective data to be transmitted to obtain an IFFT result of the respective data to be transmitted, where the IFFT result of the respective data to be transmitted is L successive symbols.

N repeated extensions are performed on each of the L successive symbols to obtain extended time domain data sequences of length N×T, where T is a symbol interval and N is a real number greater than or equal to 1.

A dot product is performed on each of the extended time domain data sequences of length N×T and discrete function values of the at least two different waveform functions to obtain L time domain data sequences of length N×T from the dot product.

The L time domain data sequences of length N×T obtained from the dot product are sequentially separated by one symbol interval T in time domain, and the L time domain data sequences of length T separated by the one symbol interval N×T are superimposed to obtain a time domain data sequence of length [N+(L−1)]×T.

T>0, a size of an OFDM symbol interval is related to the number of OFDM symbols per unit time. The OFDM symbol interval may be regarded as an interval duration between a first subcarrier of a current symbol and a first subcarrier of a next symbol. The symbol intervals between different OFDM symbols may be different. L is an integer greater than 0 and L is the number of OFDM symbols included in a transmission time interval (TTI). In the LTE, the TTI is equal to 1 ms.

In this embodiment, to be compatible with the user terminal of the CP-OFDM, when the waveform function is the rectangular function, the step in which the transmitting node performs the data modulation on the respective data to be transmitted corresponding to the at least two different waveform functions according to the at least two different waveform functions may include steps described below.

The IFFT is performed on the respective data to be transmitted to obtain the IFFT result of the respective data to be transmitted, where the IFFT result of the respective data to be transmitted is L successive symbols.

A cyclic prefix is added to a time domain data sequence of each of the L successive symbols to obtain a CP-OFDM symbol corresponding to teach of the L successive symbols.

The CP-OFDM symbols corresponding to the L successive symbols are concatenated end to end to obtain a continuous time domain data sequence including L CP-OFDM symbols.

In this embodiment, the data modulation method with the waveform functions includes, but is not limited to, the preceding method.

In this embodiment, modulated data of the at least two different waveform functions are frequency shifted and mapped onto different practical frequency subbands.

Figure 2:
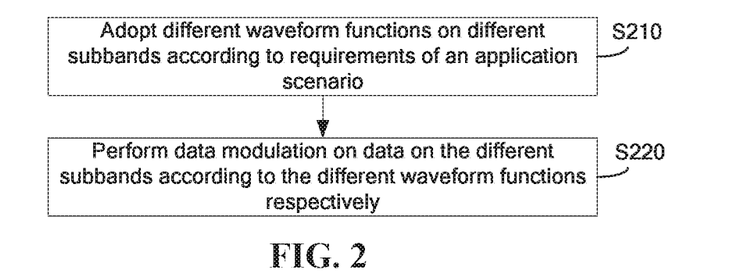
FIG. 2 is a schematic diagram of another data modulation method utilized in a multi-carrier system according to an embodiment of the present disclosure.

As shown in FIG. 2, this embodiment provides a data modulation method utilized in a multi-carrier system, which is applied to a transmitting node. The method includes steps described below.

In S210, different waveform functions are adopted on different subbands according to requirements of an application scenario.

In this embodiment, one waveform function of the different waveform functions is a raised cosine function with a roll-off factor equal to b, and the other waveform functions of the different waveform functions are non-raised cosine functions or raised cosine function with the roll-off factor not equal to b, where b is a certain value.

The raised cosine function is represented as follows:

$$x(t) = \begin{cases} B & 0 \leq |t| < T_0(1-\beta) \\ \frac{B}{2}\left(1 + \cos\left(\frac{|t| - T_0(1-\beta)}{2T_0\beta}\pi\right)\right) & T_0(1-\beta) \leq |t| < T_0(1+\beta) \\ 0 & |t| \geq T_0(1+\beta) \end{cases}$$

where t denotes time, B is a preset value, $\beta$ is the roll-off factor with a value range of [0,1], $T_0 = T_1/2$, $T_1$ denotes a time domain width parameter of the raised cosine function, $T_1(1+\beta) = N \times T$, N is a real number greater than or equal to 1, and T is a symbol interval. That is to say, a maximum time span between independent variables corresponding to non-zero function values of the raised cosine function is equal to $N \times T$.

When the roll-off factor $\beta$ is equal to different values, the corresponding raised cosine functions are different waveform functions. When $\beta = 0$, the raised cosine function is a rectangular function.

The non-raised cosine function includes a root raised cosine function, a piecewise function and the like.

In this embodiment, the transmitting node may adopt different waveform functions on different subbands at a same time point. Similarly, the transmitting node may also adopt different waveform functions on different subbands at different time points.

In this embodiment, the subband includes k subcarriers and k is an integer greater than or equal to 1.

In S220, data modulation is respectively performed on data on different subbands according to the different waveform functions.

In this embodiment, the step in which the data modulation is respectively performed on data on different subbands according to the different waveform functions may include steps described below.

IFFT is performed on data to be transmitted to obtain an IFFT result corresponding to the data to be transmitted, where the IFFT result corresponding to the data to be transmitted is L successive symbols.

N repeated extensions are performed on each of the L successive symbols to obtain L extended time domain data sequences of length N×T, where T is a symbol interval and N is a real number greater than or equal to 1.

A dot product is performed on each of the L extended time domain data sequences of length N×T and discrete function values of the different waveform functions to obtain L time domain data sequences of length N×T from the dot product.

The L time domain data sequences of length N×T obtained from the dot product are sequentially separated by one symbol interval T in time domain, and the L time domain data sequences of length N×T separated by the one symbol interval T are superimposed to obtain a time domain data sequence of length [N+(L−1)]×T.

In this embodiment, to be compatible with a user terminal of a CP-OFDM, when the waveform function is the rectangular function, the step in which the data modulation is respectively performed on the data on different subbands according to the different waveform functions may include steps described below.

The IFFT is performed on the data to be transmitted to obtain the IFFT result corresponding to the data to be transmitted, where the IFFT result corresponding to the data to be transmitted is L successive symbols.

A cyclic prefix is added to a time domain data sequence of each of the L successive symbols to obtain a CP-OFDM symbol corresponding to the each of the L successive symbols.

The CP-OFDM symbols corresponding to the L successive symbols are concatenated end to end to obtain a continuous time domain data sequence including L CP-OFDM symbols.

In this embodiment, the data modulation method with the waveform functions includes, but is not limited to, the preceding method.

In this embodiment, modulated data of the different waveform functions are frequency shifted and mapped onto different practical frequency subbands.

Figure 3:
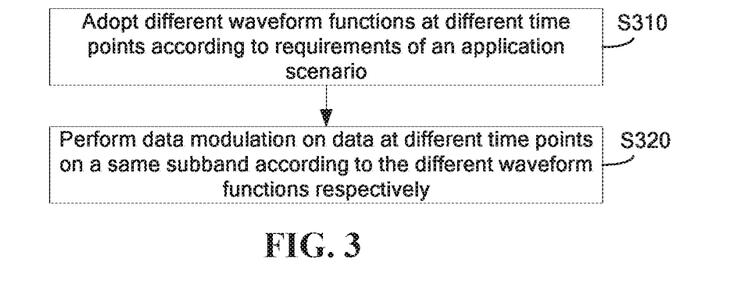
FIG. 3 is a schematic diagram of another data modulation method utilized in a multi-carrier system according to an embodiment of the present disclosure.

As shown in FIG. 3, this embodiment provides a data modulation method utilized in a multi-carrier system, which is applied to a transmitting node. The method includes steps described below.

In S310, different waveform functions are adopted at different time points according to requirements of an application scenario.

In this embodiment, one waveform function of the different waveform functions is a raised cosine function with a roll-off factor equal to b, and the other waveform functions of the different waveform functions are non-raised cosine functions or raised cosine function with the roll-off factor not equal to b.

The raised cosine function is represented as follows:

$$x(t) = \begin{cases} B & 0 \leq |t| < T_0(1-\beta) \\ \frac{B}{2}\left(1 + \cos\left(\frac{|t| - T_0(1-\beta)}{2T_0\beta}\pi\right)\right) & T_0(1-\beta) \leq |t| < T_0(1+\beta) \\ 0 & |t| \geq T_0(1+\beta) \end{cases}$$

where t denotes time, B is a preset value, $\beta$ is the roll-off factor with a value range of [0,1], $T_0 = T_1/2$ $T_1$ denotes a time domain width parameter of the raised cosine function, $T_1(1+\beta) = N \times T$, N is a real number greater than or equal to 1, and T is a symbol interval. That is to say, a maximum time span between independent variables corresponding to non-zero function values of the raised cosine function is equal to N×T.

When the roll-off factor β is equal to different values, the corresponding raised cosine functions are different waveform functions. When β=0, the raised cosine function is a rectangular function.

The non-raised cosine function includes a root raised cosine function, a piecewise function and the like.

In this embodiment, the transmitting node may adopt different waveform functions at different time points on a same subband.

In this embodiment, the subband includes k subcarriers and k is an integer greater than or equal to 1.

In S320, data modulation is respectively performed on data at the different time points on the same subband according to the different waveform functions.

In this embodiment, the step in which the data modulation is respectively performed on the data at the different time points on the same subband according to different waveform functions may include steps described below.

IFFT is performed on data to be transmitted to obtain an IFFT result corresponding to the data to be transmitted, where the IFFT result corresponding to the data to be transmitted is L successive symbols.

N repeated extensions are performed on each of the L successive symbols to obtain L extended time domain data sequences of length N×T, where T is a symbol interval and N is a real number greater than or equal to 1.

A dot product is performed on each of the L extended time domain data sequences of length N×T and discrete function values of the different waveform functions to obtain L time domain data sequences of length N×T from the dot product.

The L time domain data sequences of length N×T obtained from the dot product are sequentially separated by one symbol interval T in time domain, and the L time domain data sequences of length N×T separated by the one symbol interval T are superimposed to obtain a time domain data sequence of length [N+(L−1)]×T.

In this embodiment, to be compatible with a user terminal of a CP-OFDM, when the waveform function is the rectangular function, the step in which the data modulation is respectively performed on the data at the different time points on the same subband according to the different waveform functions may include steps described below.

The IFFT is performed on the data to be transmitted to obtain the IFFT result corresponding to the data to be transmitted, where the IFFT result corresponding to the data to be transmitted is L successive symbols.

A cyclic prefix is added to a time domain data sequence of each of the L successive symbols to obtain a CP-OFDM symbol corresponding to each of the L successive symbols.

The CP-OFDM symbols corresponding to the L successive symbols are concatenated end to end to obtain a continuous time domain data sequence including L CP-OFDM symbols.

In this embodiment, the data modulation method with the waveform functions includes, but is not limited to, the preceding method.

In this embodiment, modulated data of the different waveform functions are frequency shifted and mapped onto a same practical frequency subband.

Figure 4:
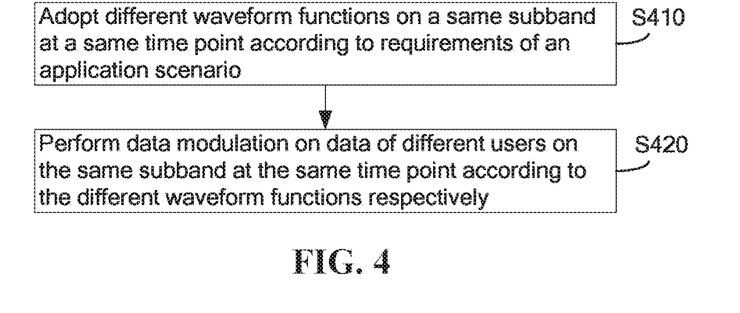
FIG. 4 is a schematic diagram of yet another data modulation method utilized in a multi-carrier system according to an embodiment of the present disclosure.

As shown in FIG. 4, this embodiment provides a data modulation method utilized in a multi-carrier system, which is applied to a transmitting node. The method includes steps described below.

In S410, different waveform functions are adopted on a same subband at a same time point according to requirements of an application scenario.

In this embodiment, one waveform function of the different waveform functions is a raised cosine function with a roll-off factor equal to b, and the other waveform functions of the different waveform functions are non-raised cosine functions or raised cosine function with the roll-off factor not equal to b.

The raised cosine function is represented as follows:

$$x(t) = \begin{cases} B & 0 \le |t| < T_0(1-\beta) \\ \frac{B}{2}\left(1+\cos\left(\frac{|t|-T_0(1-\beta)}{2T_0\beta}\pi\right)\right) & T_0(1-\beta) \le |t| < T_0(1+\beta) \\ 0 & |t| \ge T_0(1+\beta) \end{cases}$$

where t denotes time, B is a preset value, β is the roll-off factor with a value range of [0,1], $T_0=T_1/2$, $T_1$ denotes a time domain width parameter of the raised cosine function, $T_1(1+\beta)=N\times T$, N is a real number greater than or equal to 1, and T is a symbol interval. That is to say, a maximum time span between independent variables corresponding to non-zero function values of the raised cosine function is equal to N×T.

When the roll-off factor β is equal to different values, the corresponding raised cosine functions are different waveform functions. When β=0, the raised cosine function is a rectangular function.

The non-raised cosine function includes a root raised cosine function, a piecewise function and the like.

In this embodiment, the transmitting node may adopt different waveform functions for different users on the same subband at the same time point.

In this embodiment, the subband includes k subcarriers and k is an integer greater than or equal to 1.

In S420, data modulation is respectively performed on data of different users on the same subband at the same time point according to different waveform functions.

In this embodiment, the step in which the data modulation is respectively performed on the data of different users on the same subband at the same time point according to different waveform functions may include steps described below.

IFFT is performed on data to be transmitted to obtain an IFFT result corresponding to the data to be transmitted, where the IFFT result corresponding to the data to be transmitted is L successive symbols.

N repeated extensions are performed on each of the L successive symbols to obtain L extended time domain data sequences of length N×T, where T is a symbol interval and N is a real number greater than or equal to 1.

A dot product is performed on each of the L extended time domain data sequences of length N×T and discrete function values of the different waveform functions to obtain L time domain data sequences of length N×T from the dot product.

The L time domain data sequences of length N×T obtained from the dot product are sequentially separated by one symbol interval T in time domain, and the L time domain data sequences of length N×T separated by the one symbol interval T are superimposed to obtain a time domain data sequence of length [N+(L−1)]×T.

In this embodiment, to be compatible with a user terminal of a CP-OFDM, when the waveform function is the rectangular function, the step in which the data modulation is respectively performed on the data of different users on the same subband at the same time point according to the different waveform functions may include steps described below.

The IFFT is performed on the data to be transmitted to obtain the IFFT result corresponding to the data to be transmitted, where the IFFT result corresponding to the data to be transmitted is L successive symbols.

A cyclic prefix is added to a time domain data sequence of each of the L successive symbols to obtain a CP-OFDM symbol corresponding to each of the L successive symbols.

The CP-OFDM symbols corresponding to the L successive symbols are concatenated end to end to obtain a continuous time domain data sequence including L CP-OFDM symbols.

In this embodiment, the data modulation method with the waveform functions includes, but is not limited to, the preceding method.

In this embodiment, modulated data of the different waveform functions are frequency shifted and mapped onto a same practical frequency subband.

The embodiments of the present disclosure provide the data modulation method and device utilized in the multi-carrier system. With the method, the data modulation is performed by using at least two different waveform functions in the multi-carrier system. An appropriate waveform function can be selected according to practical application requirements in the multi-carrier system. Therefore, the various types of waveform modulation are applicable to the multi-carrier system and the multi-carrier system is compatible with the rectangular waveform modulation.

Embodiment 2

Figure 5:
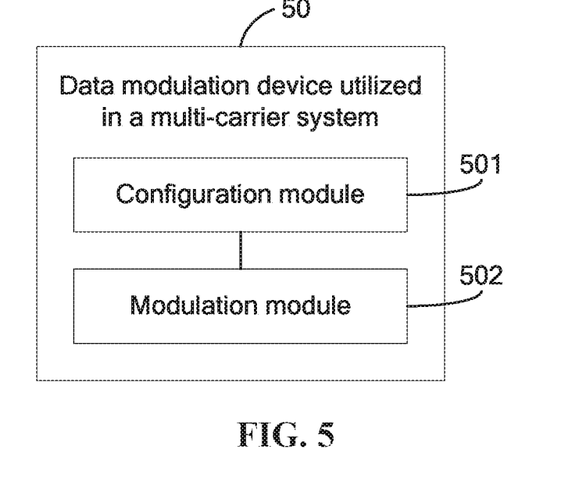
FIG. 5 is a structural diagram of a data modulation device utilized in a multi-carrier system according to an embodiment of the present disclosure.

FIG. 5 illustrates a data modulation device 50 utilized in a multi-carrier system provided by an embodiment of the present disclosure. The data modulation device may include a configuration module 501 and a modulation module 502.

The configuration module 501 is configured to adopt at least two different waveform functions. The modulation module 502 is configured to preform data modulation on respective data to be transmitted corresponding to the at least two different waveform functions according to the at least two different waveform functions.

Functions of both the configuration module and the modulation module are implemented by a processor. The processor may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It is understandable that for different apparatus, the electronic device for implementing the functions of the preceding processor may be other devices, which is not limited in the embodiments of the present disclosure.

In the preceding solution, the configuration module 501 is configured to adopt different waveform functions on different subbands or adopt different waveform functions at different time points.

In the preceding solution, the configuration module 501 is configured to adopt different waveform functions on different subbands at a same time point.

In the preceding solution, the configuration module 501 is configured to adopt different waveform functions on a same subband at different time points.

In the preceding solution, the modulation module 502 is configured to perform the operations described below.

IFFT is performed on the respective data to be transmitted to obtain an IFFT result of the respective data to be transmitted, where the IFFT result of the respective data to be transmitted is L successive symbols.

N repeated extensions are performed on each of the L successive symbols to obtain L extended time domain data sequences of length N×T; where T is a symbol interval and N is a real number greater than or equal to 1.

A dot product is performed on each of the L extended time domain data sequences of length N×T and discrete function values of the at least two different waveform functions to obtain L time domain data sequences of length N×T from the dot product.

The L time domain data sequences of length N×T obtained from the dot product are sequentially separated by one symbol interval T in time domain, and the L time domain data sequences of length N×T separated by the one symbol interval T are superimposed, to obtain a time domain data sequence of length [N+(L−1)]×T.

It should be understood by those skilled in the art that the embodiments of the present disclosure may be provided as methods, systems, or computer program products. Therefore, the present application can take the form of a hardware embodiment, a software embodiment, or a combination of software and hardware embodiments. In addition, the present application may take the form of a computer program product implemented on one or more computer-usable storage media (including, but not limited to, a disk memory and an optical memory) that includes computer-usable program codes.

The present application is described with reference to flowcharts and/or block diagrams of the methods, apparatus (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of another programmable data processing apparatus to produce a machine so that instructions executed by a computer or the processor of another programmable data processing apparatus produce a means for implementing functions specified in one or more flows in the flowcharts and/or one or more blocks in the block diagrams.

These computer program instructions can also be stored in a computer-readable memory which can direct the computer or another programmable data processing apparatus to operate in a particular manner so that the instructions stored in the computer-readable memory produce a manufactured product including an instruction means. The instruction means implements the functions specified in one or more flows in the flowcharts and/or one or more blocks in the block diagrams.

These computer program instructions can also be loaded onto the computer or another programmable data processing apparatus so that a series of operation steps are performed on the computer or another programmable apparatus to produce processing implemented by the computer. Therefore, instructions executed on the computer or another programmable apparatus provide steps for implementing the functions specified in one or more flows in the flowcharts and/or one or more blocks in the block diagrams.

The above are only embodiments of the present disclosure and are not intended to limit the scope of the present application.

INDUSTRIAL APPLICABILITY

The embodiments of the present disclosure provide the data modulation method and device utilized in the multi-carrier system. With the method, at least two different waveform functions are adopted and the data modulation is performed on the respective data to be transmitted corresponding to the at least two different waveform functions according to the at least two different waveform functions in the multi-carrier system. An appropriate waveform function can be selected according to practical application requirements in the multi-carrier system. Therefore, the various types of waveform modulation are applicable to the multi-carrier system and the multi-carrier system is compatible with the rectangular waveform modulation in the LTE system.

What is claimed is:

1. A data modulation method utilized in a multi-carrier system, comprising:
adopting, by a transmitting node, at least two different waveform functions; and performing, by the transmitting node, data modulation on respective data to be transmitted corresponding to the at least two different waveform functions according to the at least two different waveform functions;
wherein one of the at least two different waveform functions is a first raised cosine function with a roll-off factor equal to b, and another waveform function of the at least two different waveform functions is a non-raised cosine function or a second raised cosine function with a different roll-off factor not equal to b, wherein b is a real number greater than or equal to 0.

2. The method of claim 1, wherein responsive to determining that the roll-off factor of the first raised cosine function is equal to 0, the first raised cosine function is a rectangular function; and the non-raised cosine function comprises at least one of: a root raised cosine function and a piecewise function.

3. The method of claim 1, wherein the adopting, by a transmitting node, at least two different waveform functions comprises one of:
adopting, by the transmitting node, the at least two different waveform functions on different subbands; and
adopting, by the transmitting node, the at least two different waveform functions at different time points,
wherein each of the subbands comprises subcarriers and is an integer greater than or equal to 1.

4. The method of claim 3, wherein the adopting, by the transmitting node, the at least two different waveform functions on different subbands comprises:
adopting, by the transmitting node, different waveform functions on different subbands at a same time point.

5. The method of claim 3, wherein the adopting, by the transmitting node, the at least two different waveform functions at different time points comprises:
adopting, by the transmitting node, the at least two different waveform functions at different time points on a same subband.

6. The method of claim 1, wherein the performing, by the transmitting node, data modulation on respective data to be transmitted corresponding to the at least two different waveform functions according to the at least two different waveform functions comprises:
performing an inverse fast Fourier transform (IFFT) on the respective data to be transmitted to obtain an IFFT result of the respective data to be transmitted; wherein the IFFT result of the respective data to be transmitted is L successive symbols;
performing N repeated extensions on each of the L successive symbols to obtain L extended time domain data sequences of length N×T; wherein T is a symbol interval and N is a real number greater than or equal to 1;
performing a dot product of each of the L extended time domain data sequences of length N×T and discrete function values of the at least two different waveform functions to obtain L time domain data sequences of length N×T from the dot product; and
sequentially separating the L time domain data sequences of length N×T obtained from the dot product by one symbol interval T in time domain, and superimposing the L time domain data sequences of length N×T separated by one symbol interval T, to obtain a time domain data sequence of length [N+(L−1)]×T.

7. A data modulation device utilized in a multi-carrier system, comprising a processor and a storage device for storing computer executable instructions that when executed by the processor cause the processor to
adopt at least two different waveform functions; and
preform data modulation on respective data to be transmitted corresponding to the at least two different waveform functions according to the at least two different waveform functions;
wherein one of the at least two different waveform functions is a first raised cosine function with a roll-off factor equal to b, and another waveform function of the at least two different waveform functions is a non-raised cosine function or a second raised cosine function with a different roll-off factor not equal to b, wherein b is a real number greater than or equal to 0.

8. The data modulation device of claim 7, wherein the processor is caused to:
adopt the at least two different waveform functions on different subbands; or
adopt the at least two different waveform functions at different time points.

9. The data modulation device of claim 8, wherein the processor is caused to:
adopt the at least two different waveform functions on different subbands at a same time point.

10. The data modulation device of claim 8, wherein the processor is caused to:
adopt the at least two different waveform functions at different time points on a same subband.

11. The data modulation device of claim 7, wherein the processor is caused to:
perform an inverse fast Fourier transform (IFFT) on the respective data to be transmitted to obtain an IFFT result of the respective data to be transmitted; wherein the IFFT result of the respective data to be transmitted is L successive symbols;
perform N repeated extensions on each of the L successive symbols to obtain L extended time domain data sequences of length N×T; wherein T is a symbol interval and N is a real number greater than or equal to 1;
perform a dot product of each of the L extended time domain data sequences of length N×T and discrete function values of the at least two different waveform functions to obtain L time domain data sequences of length N×T from the dot product; and sequentially separate the L time domain data sequences of length N×T obtained from the dot product by one symbol interval T in time domain, and superimpose the L time domain data sequences of length N×T separated by the one symbol interval T, to obtain a time domain data sequence of length [N+(L−1)]×T.

12. A non-transitory computer-readable storage medium, storing computer-executable instructions configured to execute a data modulation method utilized in the multi-carrier system, wherein the data modulation method comprises:
adopting, by a transmitting node, at least two different waveform functions; and performing, by the transmitting node, data modulation on respective data to be transmitted corresponding to the at least two different waveform functions according to the at least two different waveform functions;
wherein one of the at least two different waveform functions is a first raised cosine function with a roll-off factor equal to b, and another waveform function of the at least two different waveform functions is a non-raised cosine function or a second raised cosine function with a different roll-off factor not equal to b, wherein b is a real number greater than or equal to 0.

13. The non-transitory computer-readable storage medium of claim 12, wherein responsive to determining that the roll-off factor of the first raised cosine function is equal to 0, the first raised cosine function is a rectangular function; and the non-raised cosine function comprises at least one of: a root raised cosine function and a piecewise function.

14. The non-transitory computer-readable storage medium of claim 12, wherein the adopting, by a transmitting node, at least two different waveform functions comprises one of:
adopting, by the transmitting node, the at least two different waveform functions on different subbands; and
adopting, by the transmitting node, the at least two different waveform functions at different time points,
wherein each of the subbands comprises subcarriers and is an integer greater than or equal to 1.

15. The non-transitory computer-readable storage medium of claim 14, wherein the adopting, by the transmitting node, the at least two different waveform functions on different subbands comprises:
adopting, by the transmitting node, different waveform functions on different subbands at a same time point.

16. The non-transitory computer-readable storage medium of claim 14, wherein the adopting, by the transmitting node, the at least two different waveform functions at different time points comprises:
adopting, by the transmitting node, the at least two different waveform functions at different time points on a same subband.

17. The non-transitory computer-readable storage medium of claim 12, wherein the performing, by the transmitting node, data modulation on respective data to be transmitted corresponding to the at least two different waveform functions according to the at least two different waveform functions comprises:
performing an inverse fast Fourier transform (IFFT) on the respective data to be transmitted to obtain an IFFT result of the respective data to be transmitted; wherein the IFFT result of the respective data to be transmitted is L successive symbols;
performing N repeated extensions on each of the L successive symbols to obtain L extended time domain data sequences of length N×T; wherein T is a symbol interval and N is a real number greater than or equal to 1;
performing a dot product of each of the L extended time domain data sequences of length N×T and discrete function values of the at least two different waveform functions to obtain L time domain data sequences of length N×T from the dot product; and
sequentially separating the L time domain data sequences of length N×T obtained from the dot product by one symbol interval T in time domain, and superimposing the L time domain data sequences of length N×T separated by one symbol interval T, to obtain a time domain data sequence of length [N+(L−1)]×T.

* * * * *